United States Patent [19]
Bestler et al.

[11] Patent Number: 5,602,920
[45] Date of Patent: Feb. 11, 1997

[54] COMBINED DCAM AND TRANSPORT DEMULTIPLEXER

[75] Inventors: Caitlin B. Bestler, Lisle; Khosro M. Rabii, Hawthorn Woods, both of Ill.

[73] Assignee: Zenith Electronics Corporation, Glenview, Ill.

[21] Appl. No.: 455,744

[22] Filed: May 31, 1995

[51] Int. Cl.$^6$ .............................. H04L 9/00; H04N 7/167
[52] U.S. Cl. ...................... 380/49; 380/9; 380/10; 380/20; 380/23; 370/412
[58] Field of Search ................... 380/9, 23, 25, 380/49, 50, 59, 10, 20; 370/110.1

[56] References Cited

U.S. PATENT DOCUMENTS 5,412,724  5/1995  Mary ............................... 380/20
5,420,866  5/1995  Wasilewski ..................... 370/110.1

*Primary Examiner*—Bernarr E. Gregory

[57] ABSTRACT

A combined condition access and transport demultiplexer circuit comprises a decryption device receiving a demodulated transport bitstream including a plurality of multiplexed conditional access (CA) and product (e.g. video, audio and data) packets, each CA packet being identified by a CA PID and each product packet by a respective product PID. A comparator is provided for comparing the PID of each received packet with a plurality of stored PID values representing the CA PID and selected product PID's. A routing manager is responsive to the comparator for routing received CA packets from the decryption device to a conditional access circuit which controls the decryption device and for routing received product packets to appropriate output ports for further processing.

14 Claims, 5 Drawing Sheets

COMBINED DCAM AND TRANSPORT DEMULTIPLEXER

BACKGROUND OF THE INVENTION

The present invention relates generally to circuits for processing received digital signals and particularly concerns circuits for performing the conditional access and transport demultiplexing functions of a digital signal television receiver.

Conditional access systems for subscriber units such as cable television subscriber set-top box decoders are well-known in the art. Conditional access is conventionally achieved by downloading one or more authorization levels for storage in the decoder. The stored authorization levels may comprise a stored bit map or a list of stored individual multi-bit codes, or a combination of both. Each received subscription program, which is normally scrambled or encrypted to prevent access thereto by an unauthorized subscriber, includes an authorization code (sometimes referred to as a program tag) identifying the associated program. If the program tag corresponds to an authorized level in the stored bit map memory or to a stored listed authorization level of the subscriber, a descrambling or decryption circuit within the subscriber's decoder is enabled to descramble or decrypt the signal for viewing by the subscriber. On the other hand, if the received program tag does not match any stored authorization level descrambling or decryption of the accompanying program is inhibited.

Depending on the desired resolution, recent advances in technology have made possible the transmission and reception of one or more digitally compressed television signals over a single 6 MHz television channel. The television signal is preferably compressed and arranged for transport in accordance with international standards established by the Moving Pictures Expert Group (MPEG). In accordance with the MPEG standard, the compressed digital television information is arranged for transmission in the form of a multiplexed transport stream of fixed length MPEG packets including, for example, video packets, audio packets and conditional access packets (all packets other than conditional access packets being referred to as product packets). Each packet in the transport stream includes a 4-byte header comprising a 13-bit packet identification code (PID) identifying the so-called payload (184 bytes) of the respective packet. A PID having a value equal to one (i.e. 00 . . . 1) has been reserved for conditional access packets.

In a general sense, conditional access for digitally compressed subscription systems of the foregoing type may be achieved using techniques quite similar to those employed in prior art analog subscription systems. In addition, the received transport stream must be demultiplexed to separate the conditional access packets and the various product packets; e.g. video and audio packets. The separated conditional access packets are ultimately used to control the conditional access system of the set-top decoder while the separated video and audio packets are supplied to respective decompression circuits which provide reproducible video and audio signals. The functions of conditional access and transport stream demultiplexing have traditionally been conceived as independent operations and have been effected by respective dedicated integrated circuits. However, since a number of similar operations must be performed in order to execute both functions, it is believed that a single circuit optimized for performing both functions through selected shared operations would be a much more efficient technique.

OBJECTS OF THE INVENTION

It is therefore a basic object of the present invention to provide an improved conditional access and transport demultiplexing system for a subscription set-top decoder.

It is a more specific object of the invention to provide a combined conditional access and transport demultiplexing circuit which shares selected operations common to both functions.

It is yet a more specific object of the invention to provide a combined conditional access and transport demultiplexing system which may be fabricated as a single integrated circuit optimized for performing both functions by sharing selected common operations.

BRIEF DESCRIPTION OF THE DRAWINGS

These and other objects and advances of the invention will be apparent upon reading the following description in conjunction with the drawings, in which.

DESCRIPTION OF THE PREFERRED EMBODIMENT

Figure 1:
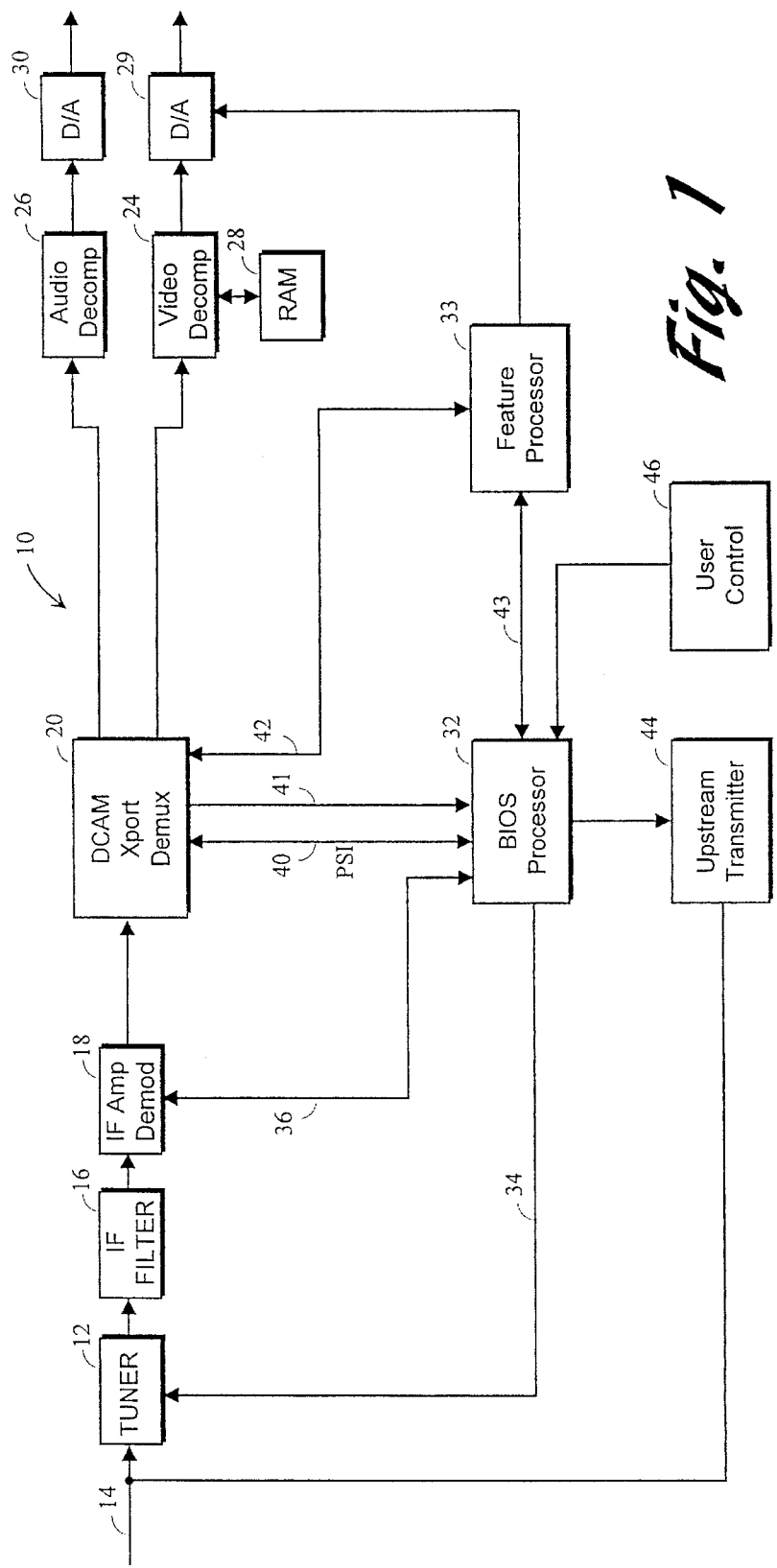
FIG. 1 is a simplified block diagram of a subscription decoder constructed in accordance with the present invention.

FIG. 1 sets forth a block diagram of a television subscriber terminal constructed in accordance with the present invention and generally referenced by numeral 10. Subscriber terminal 10 includes a tuner 12 coupled to a cable television distribution system or other suitable transmission medium (e.g. a satellite or microwave link) by a cable 14. The output of tuner 12 is coupled to an intermediate frequency (IF) filter 16, typically a SAW filter, and therefrom to the input of an IF amplifier and demodulator circuit 18. Demodulator 18 may comprise, for example, a multilevel VSB or QAM demodulator.

Figure 2:
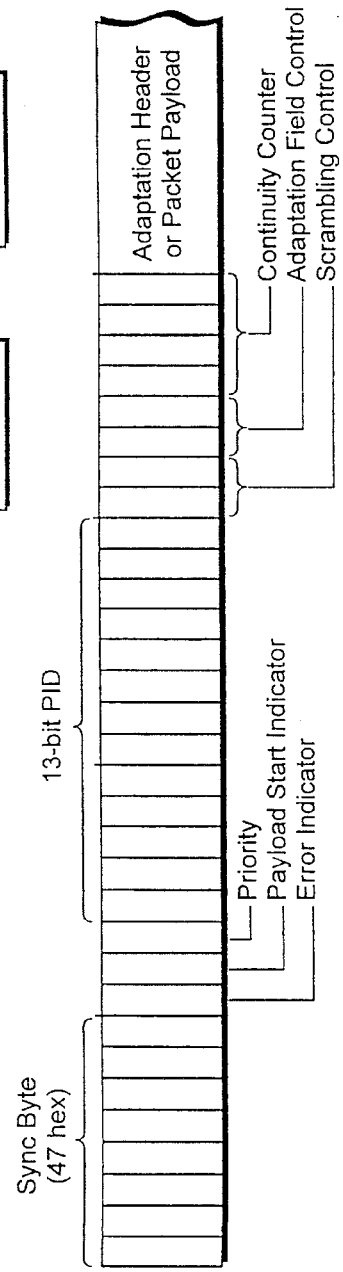
FIG. 2 is an illustration of the 4-byte MPEG transport packet header.

The output of demodulator 18 comprises an MPEG transport bitstream including a series of multiplexed MPEG product and conditional access (CA) packets. Referring to FIG. 2, each such packet includes an unencrypted 4-byte header comprising a sync byte (47 hex) and a 13-bit PID identifying the contents of the packet followed by 184-bytes of encrypted payload. The header further comprises a priority bit representing the priority of the packet, a payload start indicator bit representing inclusion in the packet payload of certain video/audio decoding information or the start of certain program information and an error indicator bit representing the existence of errors in the received packet. The header also includes a 4-bit continuity counter used by the decoder to detect lost packets, a 2-bit scrambling control indicating the scrambling mode of the payload and a 2-bit adaptation field control. As will be explained in further detail hereinafter, the adaption field control indicates the presence/absence of an adaptation header which comprises a variable number of bytes at the beginning of the 184-byte packet payload. Finally, a plurality of additional bytes may be appended to the packet to facilitate error correction of the received data in demodulator 18.

A product packet as described above may comprise a compressed video packet, a compressed audio packet or a packet containing auxiliary data. Each such packet is identified by its own unique PID, with a PID having a value of one (00 . . . 01) be reserved for CA packets. Depending on the degree of compression employed and on the maximum bit-rate provided by the transmission system, the transport bitstream derived from a tuned 6 MHz television channel may represent one or more television programs, the components packets (e.g. video and audio) of each television program being identified by their own respective PID's.

The multiplexed MPEG transport bitstream developed at the output of demodulator 18 is coupled to a digital condition access (DCAM) and transport demultiplexer 20 which will be described in further detail hereinafter. For now it is sufficient to understand that unit 20, which is adapted for fabrication as a single integrated circuit, is responsive to CA packets multiplexed in the transport bitstream for selectively authorizing and deauthorizing subscriber terminal 10 for various television programs and other services. Unit 20 is also operative for decrypting the payloads of product packets having PID's corresponding to a program selected for viewing by the subscriber and for which the subscriber has appropriate authorization and for coupling the decrypted video packets to a video decompression circuit 24 and the decrypted audio packets to an audio decompression circuit 26. Video decompression circuit 24 may include a random access memory 28 coupled thereto. The decompressed video signal developed at the output of video decompression circuit 24 is applied to a D/A converter 29 which is coupled to a suitable video display. Correspondingly, the decompressed audio signal developed at the output of audio decompression circuit 26 is applied to a D/A converter 30 which is coupled to a suitable audio system. It will be understood that D/A's 29 and 30 include appropriate circuitry for encoding/converting the outputs of decompressors 24 and 26 for providing output signals suitable for driving the video display and audio system.

Subscriber terminal 10 further includes a BIOS microprocessor 32 responsive to signals from a user control interface 46 such as an on-board keyboard, a remote control device, etc. Microprocessor 32 includes a channel selection output 34 for controlling tuner 12 (i.e. for tuning a selected 6 MHz television channel) and is coupled by a line 36 to demodulator 18. Microprocessor 32 is further coupled to unit 20 by a bus 40 and is supplied with an interrupt signal by unit 20 over a line 41. An upstream transmitter 44 is supplied by microprocessor 32 and has an output coupled to cable 14 for providing upstream transmissions over the cable distribution system. A second microprocessor 33, referred to hereinafter as a feature microprocessor, is coupled to unit 20 by a DMA channel 42 and to BIOS processor 32 by a serial communications interface (SCI) 43. Feature processor 33 is also coupled to video D/A 29.

In operation, a plurality of broadcast 6 MHz RF channels are coupled by cable 14 to the input of tuner 12 which, in response to a channel selection signal supplied by microprocessor 32, couples a selected channel to intermediate frequency filter 16. Filter 16 may be constructed in accordance with conventional fabrication techniques and may, for example, include a conventional Surface Acoustic Wave filter or its equivalent. The output of filter 16 is demodulated and error corrected by intermediate frequency amplifier and demodulator circuit 18. Demodulator 18, which may comprise a synchronous demodulator, recovers the digital multiplexed MPEG transport bitstream comprising CA packets and product packets representing one or more television programs. While different transmission signal formats and methods may be utilized in communicating data through the distribution system, the preferred embodiment shown in FIG. 1 utilizes a digital vestigial sideband (VSB) modulation system in which N-level (e.g. 16, 8, 4 or 2-level) symbols having a symbol rate of approximately 10.76 megahertz are transmitted and received over cable 14. The transport bitstream generated at the output of demodulator 18 is further processed and demultiplexed by unit 20 to provide selected input video and audio signals to decompression circuits 24 and 26 respectively. Circuits 24 and 26 perform conventional video and audio decompression operations upon the applied video and audio data to produce decompressed video and audio signals which are converted to corresponding analog signals within digital to analog converters 29 and 30. The analog signals thus provided may be applied to the video display and audio system of the subscriber's television receiver.

Figure 3:
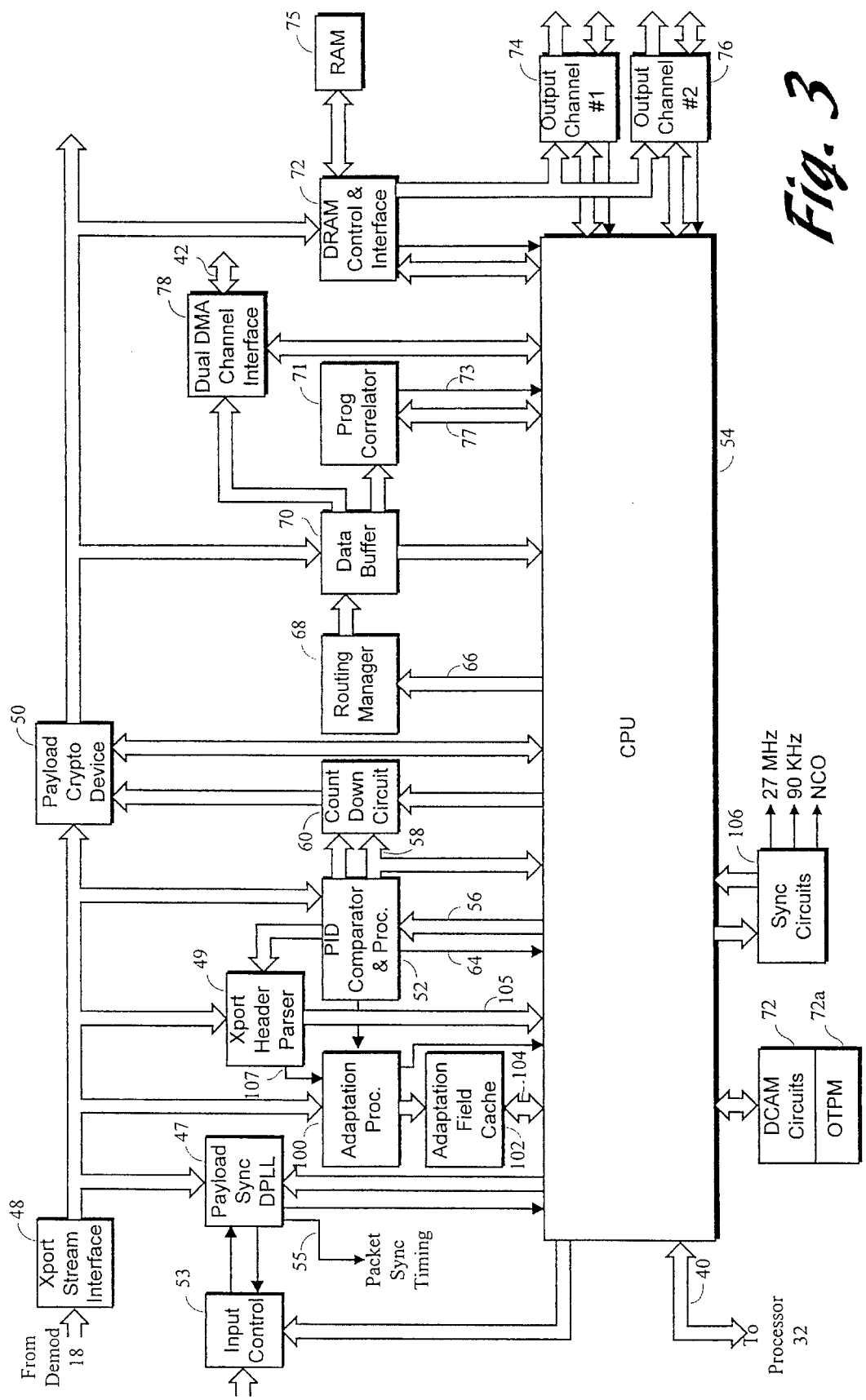
FIG. 3 is a block diagram of the DCAM and transport demultiplexer of FIG. 1.

The structure of DCAM and transport demultiplexer 20 is shown in greater detail in FIG. 3. Unit 20 preferably comprises a single ASIC which implements the conditional access and transport demultiplexer functions of subscriber terminal 10. As shown in FIG. 3, the multiplexed transport bitstream from demodulator 18 is supplied through a transport stream interface 48 to a payload sync DPLL 47, an adaptation processor 100, a transport header parser 49 and a payload crypto device 50. The transport bitstream from interface 48 is also applied to a PID comparator and processor 52 which includes 16 PID registers, one of which is always set to the value of the CA PID (i.e. PID=00 . . . 1). PID comparator 52 also receives input signals from an embedded processor 54 over a bus 56 and has an output 58 connected to processor 54 and to a countdown circuit 60. Processor 54 loads one or more selected PID values into the PID registers of PID comparator 52 over bus 56. The loaded PID values represent authorized programs selected by the viewer via interface control 46 and communicated to processor 54 through external processor 32 and bus 40.

PID comparator 52 compares the PID of each packet of the received transport bitstream against the PID's stored in its PID registers. If a match is detected, an interrupt is applied to processor 54 over a line 64 and a 4-bit value identifying the respective register is applied to the processor and to a corresponding counter in countdown circuit 60. Alternatively, the output of PID comparator 52 may comprise a 16-line bus in which case the PID register which generated the match with the received packet would be identified by setting a corresponding one of the 16 lines to an active state. In either event, processor 54 determines the contents of the packet payload from the identified PID register and applies an appropriate routing signal over a bus 66 to a routing manager 68. If the PID match was generated by a CA packet, routing manager 68 causes the decrypted CA packet from crypto device 50 to be transferred to processor 54 through a data buffer 70. The received CA data is then applied to a plurality of DCAM circuits collectively represented by block 72, which includes memory for storing subscriber authorizations, serial numbers and decryption keys.

For example, DCAM circuits 72 comprise a one-time-programmable memory (OTPM) 72a for storing a permanent serial number assigned to terminal 10. The received CA packet includes an encrypted serial number which is decrypted by payload crypto device 50 prior to being applied to processor 54, which then compares the received decrypted serial number to the terminal serial number stored in OTPM 72a. Processor 54 will accept the remainder of the CA packet only if the received and stored serial numbers match thereby providing a facility for selectively addressing each individual terminal in the system. If the PID match was generated by a video or audio packet, routing manager 68 routes the decrypted product packet from payload crypto device 50 through data buffer 70 and a DRAM control and interface 72 to a pair of output channels 74 and 76. Interface 72 is coupled to an external memory 75 to reduce jitter in the received digital product packet payloads. The output channels 74 and 76 are selectively enabled by processor 54 for providing output audio and video packets to audio decompressor 26 and video decompressor 24 respectively.

Finally, if the PID match was generated by a private data packet (e.g. Network Information Tables and Program Association and Map Tables) routing manager 68 causes the decrypted packets to be transferred from data buffer 70 to a dual DMA channel interface 78. From interface 78, the decrypted data packets are applied over bus 42 to feature processor 33, from where the data can be transferred to BIOS processor 32 over bus 43. The received private data packets may also represent data provided by a remote server from which video programs or other services have been requested by the subscriber using, for example, upstream transmitter 44. The remote server is typically connected to the local cable or other form of subscription network by one or more remote networks and communicates with individual terminals 10 by means of a 6-byte internet protocol (IP) address downloaded to a register in a programmable corelator 71 of unit 20. The decrypted payloads of such data packets (which are identified by their own unique PID) include the terminal IP address which can be detected by corelator 71. Upon detecting a match between the stored and received IP addresses, corelator 71 applies an interrupt to processor 54 over a line 73. Processor 54 is responsive to the interrupt for reading the decrypted packet payload from buffer 70. The payload may, for example, represent cost information for the requested program or service, which information may be transferred from processor 54 to feature processor 33 over DMA channel 42, and then from processor 33 to D/A 29 for display on the subscriber's television receiver.

Returning to countdown circuit 60, it will be recalled that the PID register identification signal developed by PID comparator 52 is applied to a corresponding down-counter in circuit 60. The down-counter thus counts down from a preset value toward a zero value in response to each corresponding product packet PID detected by comparator 52. Payload crypto device 50 remains enabled for decrypting the corresponding product packet payloads so long as the respective downcounter has not achieved a zero value. In order to prevent the count from reaching a zero value and thereby disabling payload crypto device 50, a CA packet is periodically sent to the terminal to preset the value of the downcounter. In this way, tampering by way of interrupting the CA packet stream is discouraged since payload crypto device 50 will quickly be disabled by countdown circuit 60.

Figure 4:
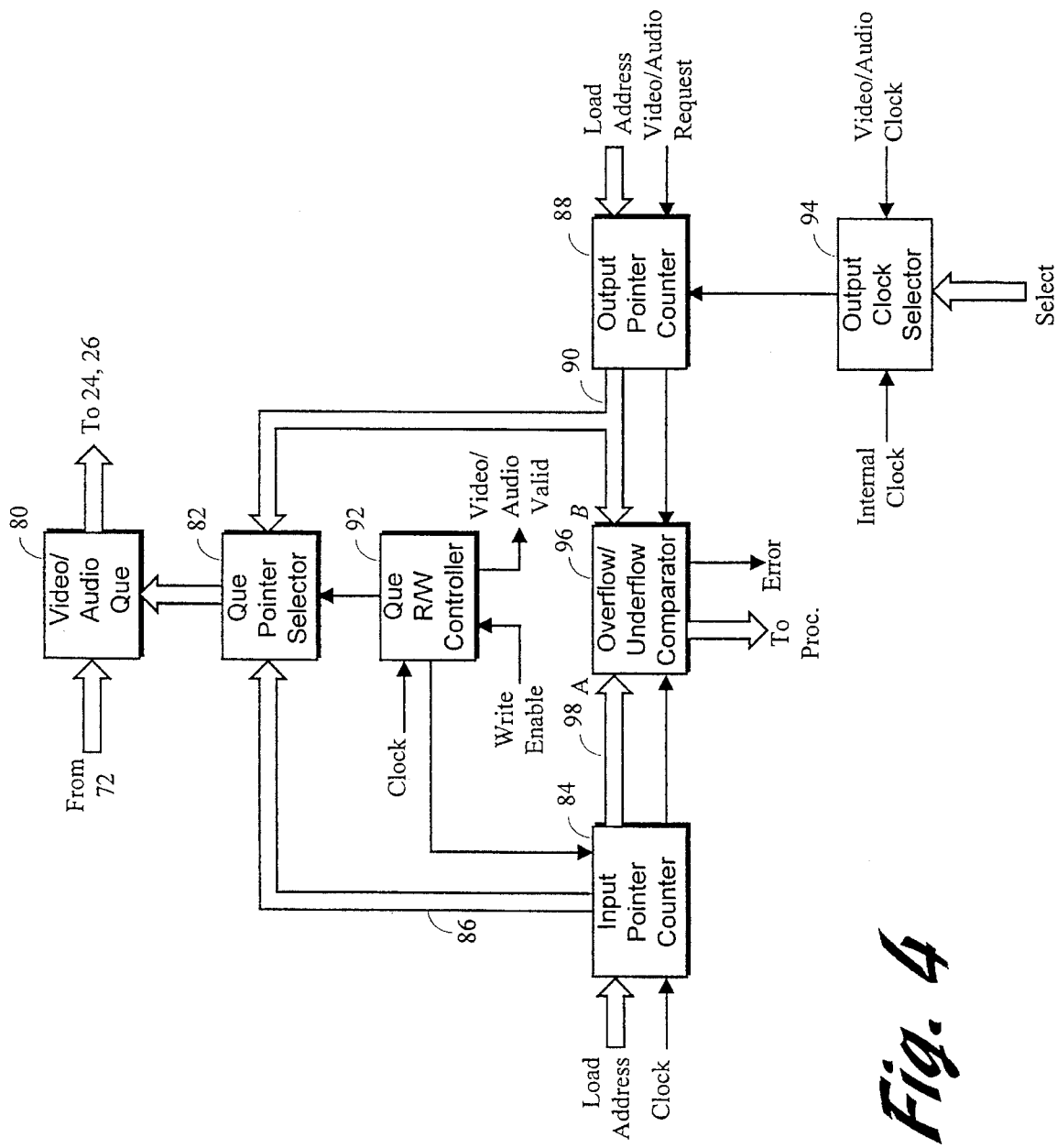
FIG. 4 is a block diagram of the output channels of the DCAM and transport demultiplexer of FIG. 2.

Each of the output channels 74 and 76 comprises two circuits, a video circuit and an audio circuit, as illustrated in FIG. 4. The demultiplexed video/audio transport packets from DRAM control and interface 72 are applied to a queue 80 which may comprise, for example, about 768 bytes. The output of queue 80 is supplied to video/audio decompression unit 24, 26. Queue 80 is controlled by queue pointer selector 82 which receives an input write address signal from an input pointer counter 84 over a bus 86, an input read address signal from an output pointer counter 88 over a bus 90 and a read/write (R/W) control from a queue R/W controller 92. Queue R/W controller 92 is operated in response to a Write Enable signal from CPU 54 and supplies respective Enable signals to counters 84 and 88 as well as a video/audio valid signal to video/audio decompressor 24, 26. Input pointer counter 84, output pointer counter 88 and queue R/W controller 92 receive respective input clock signals, the clock signal applied to counter 88 preferably being selected by CPU 54 from an internal clock or a clock generated by video/audio decompressor 24, 26 through an output clock selector 94. In addition, input and output pointer counters receive respective load address inputs from CPU 54, output counter 88 also receiving a Video/Audio Request input signal from video/audio decompressor 24, 26.

Each circuit of FIG. 4 further comprises an overflow/underflow comparator 96 having an A input to which is applied an address signal from input counter 84 over a bus 98 and a B input to which is applied the read address signal from output counter 88 on bus 90. The write and read address signals generated on busses 86 and 90 by input and output counters 84 and 88 respectively each comprise m bits, whereas the address signal generated on bus 98 comprises m+1 bits corresponding to the write address signal on bus 86 with an additional least significant bit. As will be explained in further detail hereinafter, comparator 96 is responsive to the address signals supplied to its A and B input for generating an error signal indicating an overflow or underflow condition of queue 80 for application to video/audio decompressor 24, 26 and a signal representing the magnitude of the overflow or underflow condition for application to CPU 54.

In operation, the circuit of FIG. 4 has a default state in which it is held in a Read mode. This default state is established by queue R/W controller 92 which maintains the Enable inputs of input and output counters 84 and 88 respectively inactive and active and which applies a R control signal to queue pointer selector 82. Whenever a transport packet is to be written to queue 80, a Write Enable signal is applied by CPU 54 to queue R/W controller 92 taking it out of its default state. In particular, in response to a Write Enable signal from CPU 54, controller 92 enables input pointer counter 84, disables output pointer counter 88 and applies a W control signal to selector 82. The write address on bus 86 is thereby applied by selector 82 to queue 80 for writing the transport packet into the corresponding address of the queue. As further packets are received, they are written into the queue at successive address locations in a similar manner. As each such packet is written into queue 80, controller 92 generates a video/audio valid signal for application to video/audio decompressor 24, 26.

As previously explained, whenever a packet is not being written into queue 80 the circuit of FIG. 4 defaults to its Read mode. In this mode, the read address signal on bus 90 is applied by selector 82 to queue 80 for reading the packet stored at the corresponding address of the queue. The read address is incremented in response to each video/audio request signal from video/audio decompressor 24, 26 so that packets are read from the queue as requested by the respective decompressor. Moreover, since the write mode takes precedence over the read mode, there is no chance of data loss due to memory operation.

Overflow/underflow comparator 96 continuously monitors the states of the address signals at its A and B inputs as the foregoing writing and reading operations take place. More specifically, comparator 96 compares the value of the write address signal at its A input to the read address signal at its B input in relation to the length of queue 80. If the quantity (A–B) is greater than the length of queue 80 a buffer overflow condition exists and a video/audio error signal is applied to respective video/audio decompressor 24, 26. The value of the quantity (A–B) is also supplied back to CPU 54. The value of this quantity in relation to the length of queue 80 is related to the fullness of the queue. CPU 54 may therefore use this value to regulate the fullness of the queue.

In a practical embodiment of the invention, it is preferred to fabricate the four queues 80 (two video and two audio) using the same memory device. In this case, the Load Address signals applied to input and output pointer counters 84 and 88 partition the single memory into respective portions for each of the queues.

Referring back to FIG. 3, the demodulated transport packets are applied from interface 48 to adaption processor 100 which has an output supplying an adaptation field cache 102. Processor 100 has a further output connected to an interrupt input of CPU 54 and cache 102 is coupled to the CPU by a bus 104. As previously explained, certain ones of the demodulated MPEG transport packets identified by the adaptation field control header bits include an adaptation header. Transport header parser 49 is enabled by comparator 52 in response to a PID match for parsing the various components of the transport packet header (see FIG. 2) to CPU 54 over a bus 105 and for identifying the presence of an adaptation header to adaptation processor 100 over a line 107. In response to this identification and to a PID match signal from comparator 52, processor 100 is operable for intercepting and applying the respective adaptation header to CPU 54 through adaptation field cache 102. The adaptation header in particular includes a program clock reference (PCR) value which is intended to be used for synchronizing a 27 MHz system clock in the MPEG video encoder and decoder. The PCR comprises a 33bit field and a 9 bit extension field, the extension field cycling from 0 to 299 at a 27 MHz rate for incrementing the 33 bit field. CPU 54 applies the received PRC values to a synchronization circuit 106 which, as will be described in detail below, uses the PCR values to synchronize a 27 MHz crystal oscillator to the 27 MHz clock used in the encoder. The synchronized 27 MHz clock is applied to video decompressor 24 which in the preferred embodiment of the invention comprises an MPEG-2 decoder. Video decompressors based on the MPEG-1 standard utilize a 90 KHz system clock and synchronization circuit 106 is also operable for producing this clock signal. Finally, synchronization circuit 106 is also operable for producing a numerically controlled clock signal (e.g. 48 KHz) for application to audio decompressor 26.

Figure 5:
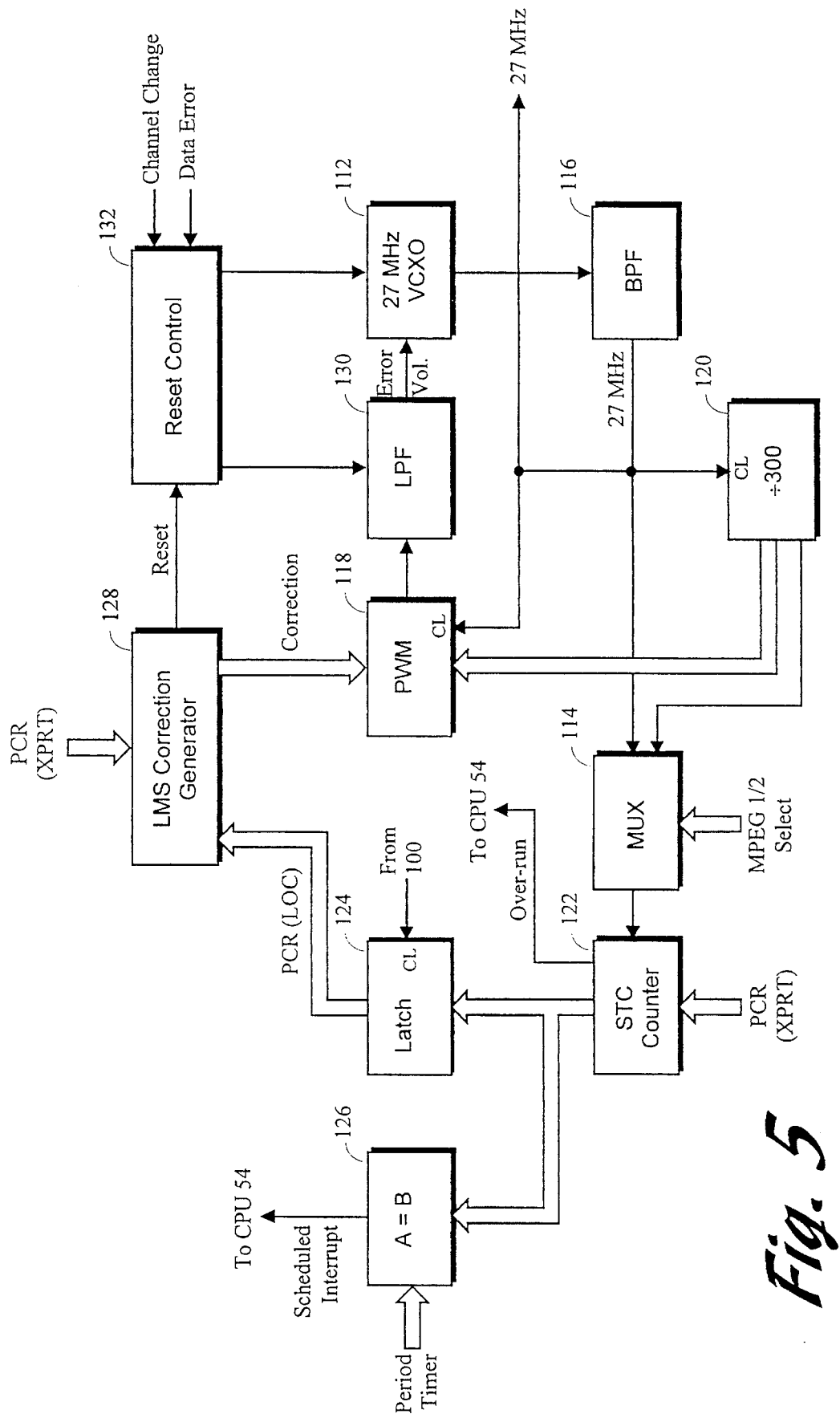
FIG. 5 is a block diagram of a first PLL of the sync circuits 106 of the DCAM and transport demultiplexer of FIG. 2.

Referring to FIG. 5, synchronization circuit 106 comprises a system clock recovery circuit generally identified by reference numeral 110. System clock recovery circuit 110 comprises a phase lock loop including a 27 MHz crystal controlled oscillator 112 supplying a 27 MHz clock signal to one input of a multiplexer 114 through a bandpass filter 116 and to the clock inputs of a pulse width modulator 118 and a divide-by-300 divider 120. The 90 KHz output of divider 120 is supplied to a second input of multiplexer 114. The MPEG-2 standard specifies a system clock of 27 MHz while a 90 KHz system clock is used in the MPEG-1 standard. Multiplexer 114 therefore has a MPEG-½ select input supplied by CPU 54 for selecting either the 27 MHz clock signal from BPF 116 (MPEG-2 mode) or the 90 KHz clock signal from divider 120 (MPEG-1 mode) providing backward compatibility with older MPEG-1 technology.

Assuming operation in the MPEG-2 mode, the 27 MHz clock from BPF 116 is coupled by multiplexer 114 to the clock input of a system timing counter (STC) 122 which comprises a 42 bit counter corresponding to the 42 (33+9) bit PCR value. Counter 122 is periodically pre-loaded with the received PCR values from cache 102 and is responsive to the 27 MHz clock for supplying an output count relative to the pre-loaded PCR values to a latch 124 and a comparator 126. Latch 124 is clocked by adaptation processor 100 for latching the count from counter 122 in response to the receipt of a new PCR value, PCR (XPRT), and for coupling the latched count to one input of a correction signal generator 128. The received PCR value PCR (XPRT) is also supplied to a second input of generator 128 which executes a least mean square error algorithm for generating a correction signal which is applied to PWM 118 to force oscillator 112 to adjust its frequency for minimizing any differences between PCR (XPRT) and the locally generated PCR value, PCR(LOC), supplied by latch 124. The algorithm executed by generator 128 may, for example, be represented by the equation:

correction (*n*)=correction (*n*–1)–*KPCR(EXP)*[*PCR(XPRT–PCR-(LOC)*], where K=constant and PCR(EXP)=the expected PCR value.

PWM 118 comprises a circuit for continuously comparing the value of the correction signal supplied by generator 128 to a periodic ramp signal (a count of 0–299 at a 27 MHz rate) supplied by divider 120. The PWM provides an output whenever the count is less than the value of the correction signal so that the duty cycle of the pulse width modulated output of PWM 118 represents the value of the correction signal. The modulated signal from PWM is applied through a low pass filter 130 which generates an error voltage for appropriately adjusting the frequency of oscillator 112 and thereby completing the phase lock loop.

Generator 128 also generates a reset signal which is applied to a reset control 132. The reset signal is generated under various conditions such as when the difference between PCR (XPRT) and PCR(LOC) is very large and results in reset control 132 applying a signal causing LPF 130 to switch to a lower Q state (relative to steady-state operation) and another signal for putting oscillator 112 in its free run mode. Reset control 132 may similarly operate LPF 130 and oscillator 112 in response to a channel change signal from processor 32 or a data error signal from demodulator 18 (see FIG. 1).

Comparator 126 is responsive to a Period Timer signal from CPU 54 representing a time interval slightly greater than the expected time of arrival of the next PCR(XPRT) value (about 100 ms) and the output of counter 122 for generating a Scheduled Interrupt signal for application to CPU 54. The Scheduled Interrupt signal indicates an error condition wherein a PRC(XPRT) value has not been received within an expected nominal interval. Another error condition is represented by the over-run signal generated by counter 122, which also reflects the failure to receive a PCR(XPRT) value.

Figure 6:
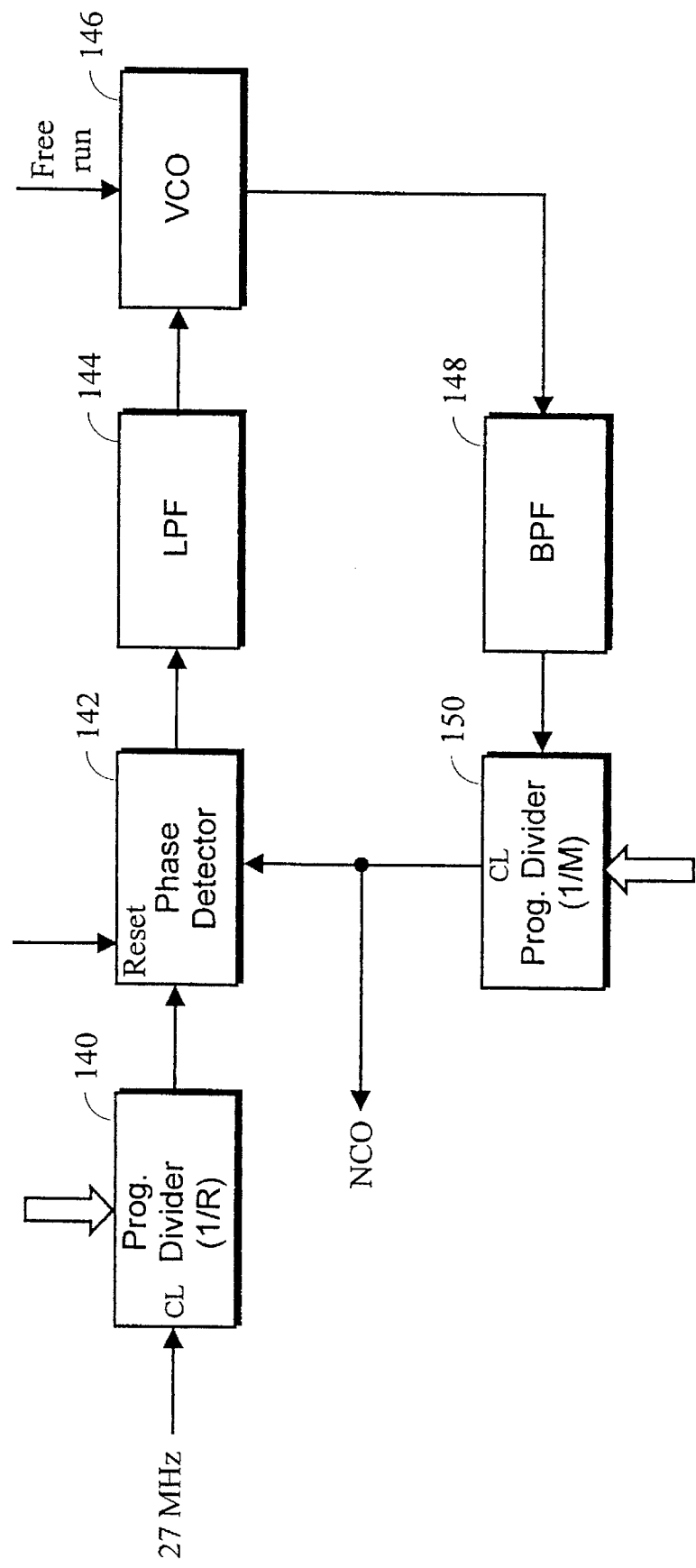
FIG. 6 is a block diagram of a second PLL of the sync circuits 106 of the DCAM and transport demultiplexer of FIG. 2.

A second PLL found within synchronization circuit 106 is illustrated in FIG. 6. This PLL is responsive to the 27 MHz system clock signal generated by the system clock recovery PLL of FIG. 4 for generating a numerically controlled clock output (NCO) for application to audio decompressor 26. For example, NCO may equal 48 KHz or any other typical sampling frequency used by an audio decoder. The PLL comprises a 1/R programmable divider 140 clocked by the 27 MHz system clock generated by the system clock recovery PLL. The output of divider 140 is applied through a phase detector 142 and a low pass filter 144 to the error control input of a voltage controlled oscillator (VCO) 146. The output of VCO 146 is applied through a bandpass filter 148 to the clock input of a second 1/M programmable divider 150. The output NCO of divider 150 is applied to the second input of phase detector. It will be appreciated that the operation of the PLL will be such as to force VCO/M (i.e. NCO)=27 MHz/R. The frequency of NCO can therefore be conveniently adjusted by selecting appropriate values for programmable divisors R and M. This circuit provides the advantage of synchronizing the operation of the audio decoder to the system clock signal.

Payload sync DPLL 47 is provided for generating an output timing signal, identified as packet sync timing, which indicates the start of each received transport packet. This packet sync signal is distributed throughout the circuit of FIG. 3 to enable the various functional elements to properly locate the constituent parts of the received transport packets. In a preferred embodiment of the invention, payload sync DPLL 47 comprises the sync signal recovery system shown in U.S. Pat. No. 5,274,676. As set forth in greater detail in the patent, a high degree of noise immunity is provided by this sync recovery system by establishing a narrow syncoronization signal detection window after the sync signal has been determined to be periodic with a selected degree of confidence. The degree of confidence is represented by a confidence count supplied by CPU 54 to DPLL 47 which, in turn, applies a signal back to the CPU indicating whether the received sync signal has been determined to be periodic with the selected degree of confidence. In one embodiment of the invention, the detected packet sync signal comprises the MPEG sync byte (47 hex) consisting of the first byte of the 4-byte unencrypted header of each transport packet (see FIG. 2) which is supplied to DPLL 47 by transport stream interface 48. In a second embodiment of the invention, the detected packet sync signal is supplied by an input control circuit 53. This embodiment is used in cases where the transport packets are received with 3-byte headers in which the MPEG sync byte is omitted. In such cases, demodulator 18 generates a sync signal defining the beginning of each received transport packet and supplies this sync signal to input control circuit 53 for application to DPLL 47. CPU 54 supplies a signal to input control circuit 53 indicating whether its input is in serial or parallel form. DPLL 47 also supplies a signal to circuit 53 representing the state of periodicity of the supplied sync signal.

What has been described is a novel combined conditional access and transport demultiplexer circuit. It is recognized that numerous changes in the described embodiment of the invention will be apparent to those skilled in the art. The invention is to be limited only as defined in the claims.

What is claimed:

1. A combined conditional access and transport demultiplexer circuit, comprising:

means for receiving a transport bitstream comprising a plurality of multiplexed conditional access and product packets, each of said conditional access packets being identified by a conditional access PID and each of said product packets being identified by a respective product PID;

decypting means for decrypting said received packets;

conditional access means for selectively enabling said decrypting means;

one or more output ports;

means for storing a value corresponding to said conditional access PID and one or more values corresponding to selected ones of said product PID's;

means for comparing the PID of each of said received packets with said stored PID values; and means responsive to said comparing means for routing said conditional access packets from said decrypting means to said conditional access means and said product packets from said decrypting means to a selected one of said output ports.

2. The combined conditional access and transport demultiplexer circuit of claim 1 wherein said output ports comprise a video output port and an audio output port.

3. The combined conditional access and transport demultiplexer circuit of claim 2 wherein said output ports comprise at least two video output ports and at least two audio output ports.

4. The combined conditional access and transport demultiplexer circuit of claim 2 wherein each of said video and audio output ports comprises a queue having an input coupled to said means for routing, an input counter, an output counter and means for selectively applying write and read address signal from said input and output counters to said queue for respectively writing product packets into said queue and subsequently reading said written packets from said queue.

5. The combined conditional access and transport demultiplexer circuit of claim 4 wherein each of said video and audio output ports further comprises a controller responsive to an enable signal from said means for routing for operating said applying means for applying said write address signal from said input counter to said queue and responsive to the absence of said enable signal for operating said applying means for applying said read address signal from said output counter to said queue.

6. The combined conditional access and transport demultiplexer circuit of claim 5 wherein each of said video and audio output ports further comprises a comparator responsive to said write and read address signals from said input and output counters for generating an output signal indicating an overflow or underflow condition of said queue.

7. The combined conditional access and transport demultiplexer circuit of claim 2 wherein said output ports comprise a data output port.

8. The combined conditional access and transport demultiplexer of claim 7 wherein said data output port comprises a DMA channel.

9. The combined conditional access and transport demultiplexer of claim 2 wherein said routing means comprises a buffer for temporarily storing the decrypted packets provided by said decrypting means, a microprocessor coupled to said comparing means and a routing manager responsive to said microprocessor for causing said buffer to transfer said stored packets to said selected output port.

10. The combined conditional access and transport demultiplexer of claim 9 wherein said routing manager is responsive to said microprocessor for causing said buffer to transfer said conditional access packets to said microprocessor for application to said conditional access means.

11. The combined conditional access and transport demultiplexer of claim 9 including a correllator storing a predetermined downloaded address, said correllator applying a control signal to said microprocessor in response to detecting a match between said stored address and an address comprising part of a packet stored in said buffer.

12. The combined conditional access and transport demultiplexer of claim 11 wherein said microprocessor is responsive to said control signal for applying an information signal to said video output port derived from the packet resulting in said match.

13. The combined conditional access and transport demultiplexer of claim 1 including a synchronization PLL comprising a VCO generating a first clock reference signal having a frequency f, a counter coupled to the output of said VCO and assuming a preset state in response to a PCR value encoded in each of a plurality of selected ones of said received packets, a divider for dividing said first clock reference signal by a fixed divisor d for generating an output ramp signal and a second clock reference signal both having a frequency related to f/d, PWM means responsive to the output of said counter and said ramp signal for generating and applying an error signal to said VCO for synchronizing said first clock reference signal and said PCR values and means for selectively applying said second clock reference signal to said counter in place of said first clock reference signal.

14. The combined conditional access and transport demultiplexer of claim 13 wherein f=27 MHz, D=300 and said second clock reference signal has a frequency of 90 KHz.

* * * * *